3,658,734
GUAR GUM-POLYACRYLAMIDE COMPOSITIONS
David J. Pettitt, San Diego, Calif., assignor to Kelco
Company, San Diego, Calif.
No Drawing. Filed Oct. 20, 1970, Ser. No. 82,478
Int. Cl. C08f 45/18
U.S. Cl. 260—17.4 ST                        24 Claims

ABSTRACT OF THE DISCLOSURE

A mixture of a relatively undegraded guar gum having a viscosity at a concentration of 1% by weight in water of about 500 centipoises or more with a polyacrylamide having a degree of polymerization between about 12,000 and about 250,000 with the weight ratio of guar gum to polyacrylamide ranging from about 0.5:1 to about 50:1 or higher. A process for forming a thickening composition by admixing a relatively undegraded guar gum having a 1% by weight aqueous viscosity of about 500 centipoises or higher with a polyacrylamide having a degree of polymerization between about 12,000 and about 250,000 at a weight ratio of guar gum to polyacrylamide ranging from about 0.5:1 to about 50:1 or higher. A thickened aqueous medium containing a mixture of a relatively undegraded guar gum having a 1% aqueous viscosity of about 500 centipoises or higher with a polyacrylamide having a degree of polymerization between about 12,000 and 250,000 at a weight ratio of guar gum to polyacrylamide ranging from about 0.5:1 to about 50:1 or higher with the mixture being present in an amount which is effective to synergistically increase the viscosity of the aqueous medium.

---

This invention relates to a thickening composition which, when added to an aqueous medium, produces a synergistic increase in the viscosity of the medium. More specifically, the invention pertains to a composition which comprises a mixture of a relatively undegraded guar gum with a polyacrylamide, its method of preparation and its use in thickening an aqueous medium.

Both guar gum and polyacrylamide are known materials of commerce. I have found that a mixture of these materials, when added to an aqueous medium, produce a synergistic increase in the viscosity of the medium. This result is quite advantageous since it permits the obtaining of significant viscosities in an aqueous medium while using a lesser quantity of the thickening composition.

The guar gum which is employed in my compositions is relatively undegraded such that it will produce a viscosity at a 1% by weight concentration in an aqueous medium of about 500 centipoises or higher as measured with a Brookfield Viscometer, Model LVF, at a spindle speed of 60 r.p.m. and a temperature of about 25° C. Preferably, the guar gum which is employed in my compositions has a 1% by weight aqueous viscosity of about 900 centipoises to about 3500 centipoises, as measured with a Brookfield Viscometer described above.

Polyacrylamide is available as a commercial material in three basic forms which are the neutral, anionic and cationic forms. The basic polymer unit for a neutral polyacrylamide is as follows:

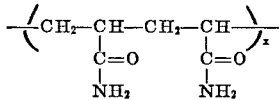

in which $x$ represents the average number of the repeating basic units in the polymer chain which is defined as the degree of polymerization (D.P.) of the polymer. A second form of polyacrylamide is the anionic form which has the basic structure:

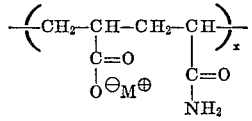

In the formula $x$ represents the average number of repeating basic units in the polymer structure or its D.P., while M is a monovalent positive ion, such as sodium, potassium, or ammonium.

A still further form in which polyacrylamide may be obtained is the cationic form having the following basic structure:

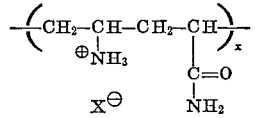

In the above formula, $x$ again represents the average number of repeating structural units in the polymer chain while X is a monovalent negative ion, such as a chloride, bromide or iodide ion.

Polyacrylamide is available in a variety of molecular weights ranging from as low as 200,000 to as high as about 10 to 15 million. When used in accord with my invention, the polyacrylamide should have a degree of polymerization (D.P.) between about 12,000 to about 250,000, which is represented by $x$ in the above structural Formulas I–III. Any of the three forms of polyacrylamide—neutral, anionic or cationic—may be used in conjunction with guar gum in the practice of my invention.

The weight ratio of guar gum to polyacrylamide in my compositions ranges from about 0.5:1 to about 50:1 or higher. Preferably, the weight ratio of guar gum to polyacrylamide ranges from about 2:1 to about 20:1.

In use, my thickening compositions are added to an aqueous medium with sufficient agitation to dissolve the composition in the aqueous medium. The concentration of my compositions in aqueous medium may be varied depending upon the degree of thickening which is desired. Thus, my compositions may be added in any concentration which is effective to cause thickening and, in general, I have found that concentrations of my compositions ranging from about 0.1% to about 3% by weight of the water in the aqueous composition provide satisfactory thickening.

Certain of my compositions are somewhat sensitive to variations in the pH of the aqueous medium. For example, I have found that my compositions which contain a relatively undergraded guar gum in conjunction with an anionic polyacrylamide, undergo a marked change in viscosity in an aqueous medium as a result of changes in the pH of the medium. It was found that a mixture of 20 parts by weight of relatively undergraded guar gum having a 1% by weight aqueous viscosity of 1720 cps. with one part by weight of an anionic polyacrylamide having a molecular weight of 10 to 15 million and a 1% by weight aqueous viscosity of 240 centipoises produced a viscosity of 2600 centipoises at a concentration of one percent by weight in distilled water at a pH of 7. At a pH of 5, the viscosity of the aqueous medium was 1850 centipoises and at a pH of 9, the viscosity was 2350 centipoises. The effect of pH of my compositions which contain a mixture of a relatively undergraded guar gum with either a neutral polyacrylamide or a cationic polyacrylamide was less marked. However, in all cases tested, it was found that my thickening compositions performed best at a pH range between about 5 to about 11.

Tests were also performed to determine the effect of various acids and salts on the stability of my thickening compositions in an aqueous medium. In these tests, it was found that my thickening compositions were reasonably stable to formic acid, acetic acid, ammonium chloride, and ammonium salts such as benzyldodecyldimethylammonium chloride and benzyltrimethylammonium chloride at a 3% by weight concentration for periods ranging up to 165 hours. In the tests it was found that phosphoric acid at a concentration of 3% by weight caused degradation of my thickening compositions in an aqueous medium to produce a sharp reduction in viscosity.

To further illustrate my invention, there are presented the following examples in which all parts and percentages are by weight unless otherwise indicated.

EXAMPLE I

Thickening compositions were made up by mixing varying quantities of a relatively undegraded guar gum with varying quantities of an anionic polyacrylamide having a molecular weight in the order of 10 to 15 million (Separan AP 273, Dow Chemical Company). The guar gum had a viscosity of 1720 centipoises at a 1% by weight concentration in distilled water and the polyacrylamide had a viscosity of 2240 centipoises at a 1% by weight concentration is distilled water. The various mixtures of guar gum with polyacrylamide were each added to distilled water at a concentration of 1% by weight of the mixture. At a weight ratio of guar gum to polyacrylamide of 1:1, the aqueous medium had a viscosity of 3750 cps.; at a 2:1 weight ratio, the viscosity was 3670 cps. and at a 5:1 weight ratio the viscosity was 3400 cps. Using a weight ratio of guar to polyacrylamide of 10:1, the viscosity was 2800 cps. and at a weight ratio of 20:1, the 1% aqueous viscosity was 2500 cps.

As shown by the above data in Example I, my thickening compositions produce a synergistic increase in the viscosity of an aqueous medium over a wide range of weight ratios of guar gum to polyacrylamide. Also, my compositions can be employed over a wide concentration range. Thus, when Example I is repeated at thickener concentrations ranging from 0.1 to 3.0 percent by weight, synergistic thickening of the aqueous medium is obtained.

In other tests which were performed, a number of additional thickening compositions of my invention were formulated and tested in distilled water to determine their effect in increasing the viscosity of an aqueous medium. These data are presented in the following table:

effective in improving the dissolving characteristics of the guar gum. That is to say, the mixture of guar gum and polyacrylamide had better dissolving characteristics than guar gum alone.

Also, it was found that the presence of the polyacrylamide modified the flow properties of a guar gum solution. This was determined by plotting the solution viscosity of a guar gum solution with respect to the applied shear rate in reciprocal seconds. These data were obtained by use of a Haake Rotovisco Viscometer. By plotting the solution viscosity on the vertical axis and shear rate on the horizontal axis, it was found that the viscosity-shear rate curve had an increased negative slope after the addition of the polyacrylamide to the guar gum solution. That is to say, the addition of polyacrylamide increased the pseudoplasticity of the guar gum solutions.

The pseudoplasticity of the solution refers to the relationship between the viscosity of the solution and the applied shear to the solution. In a pseudoplastic liquid, the viscosity of the liquid varies in an inverse relation with respect to the applied shear rate and when the shear rate is increased there is an almost instantaneous drop in the viscosity of the liquid. This property is of great advantage in a number of applications such as, for example, in a drilling fluid where it is desired that the fluid have a high viscosity at rest in order to suspend the cuttings and a low viscosity under shear such that the fluid can be pumped down the drill pipe to the drill and then returned to the mud pit at the surface where the cuttings are removed.

Also, the property of pseudoplasticity is of great advantage in a textile print paste which must flow readily during its application to the fabric and must then set up on the fabric so that the applied color does not run. In this regard, my compositions are admirably suited for use in a textile print paste because of their general stability to various acids and to ammonium salts. It was also found that my compositions were generally compatible with cationic dyes with the exception of methylene blue.

I claim:

1. A composition comprising a mixture of guar gum and a polyacrylamide with a weight ratio of guar gum to polyacrylamide of about 0.5 to 1 to about 50 to 1, said guar gum having a one percent by weight aqueous viscosity of at least about 500 centipoises as measured with

| Polyacrylamide (PAM) trade name | Type of PAM | Molecular wt. (PAM) in millions | PAM viscosity (cps.) (1% in distilled water) | Guar viscosity (cps.) (1% in distilled water) | 1% aqueous viscosities in distilled water (cps.) of guar/PAM mixtures at varying weight ratios of guar to PAM | | | | |
|---|---|---|---|---|---|---|---|---|---|
| | | | | | 1:1 | 2:1 | 5:1 | 10:1 | 20:1 |
| Magnifloc 835A American Cyanamid Co | Anionic | 10-15 | 1,600 | 1,720 | 3,200 | 3,450 | 3,390 | 2,880 | 2,000 |
| Polyfloc 1220 Betz Company | do | | 2,000 | 1,400 | | | | 3,030 | 2,720 |
| Polyfloc 1230 Betz Company | do | | 2,150 | 1,400 | | | | 2,950 | 2,650 |
| Separan NP20 Dow Chemical Co | Neutral | 4 | 360 | 1,720 | | | | 2,350 | 2,150 |
| Separan NP10 Dow Chemical Co | do | 1 | 315 | 1,720 | | | 1,770 | 1,710 | |
| Polymer 470 Drew Chemical Corp | Cationic | 5 | 470 | 1,720 | | 1,900 | 2,140 | 2,150 | |

The molecular weights of the various polyacrylamides denoted by the tradename Polyfloc were not available from the manufacturer. However, from the viscosity data for these polymers, it is clear that they have high molecular weights and a degree of polymerization within the range between about 12,000 and about 250,000.

As demonstrated in the table, the various compositions of my invention include a considerable range of ratios of guar gum to polyacrylamide and include the use of various types of polyacrylamide, including anionic, neutral and cationic polyacrylamides. In all of these tests, the use of a mixture of relatively undegraded guar gum and polyacrylamide, both as specified, produced a synergistic increase in the viscosity of the aqueous medium to which they were added.

In addition to producing a synergistic viscosity increase in the aqueous medium, it was found that the addition of the polyacrylamide to guar gum was, in many cases, a Brookfield Viscometer, Model LVF, at 60 r.p.m. and 25° C., and said polyacrylamide having a degree of polymerization of about 12,000 to about 250,000.

2. The composition of claim 1 wherein the weight ratio of guar gum to polyacrylamide is about 2:1 to about 20:1.

3. The composition of claim 1 wherein said polyacrylamide is an anionic polyacrylamide.

4. The composition of claim 1 wherein said polyacrylamide is a neutral polyacrylamide.

5. The composition of claim 1 wherein said polyacrylamide is a cationic polyacrylamide.

6. The composition of claim 1 wherein said guar gum has a one percent by weight aqueous viscosity ranging from about 900 cps. to about 3500 cps.

7. A method for increasing the viscosity of an aqueous medium, said method comprising admixing guar gum with a polyacrylamide at a weight ratio of guar gum to polyacrylamide of about 0.5:1 to about 50:1, said guar gum having a one percent by weight aqueous viscosity of at least about 500 centipoises as measured with a Brookfield Viscometer, Model LVF, at 60 r.p.m. and 25° C., and said polyacrylamide having a degree of polymerization of about 12,000 to about 250,000.

8. The method of claim 7 wherein said polyacrylamide is an anionic polyacrylamide.

9. The method of claim 7 wherein said polyacrylamide is a neutral polyacrylamide.

10. The method of claim 7 wherein said polyacrylamide is a cationic polyacrylamide.

11. The method of claim 7 wherein said guar gum has a one percent by weight aqueous viscosity ranging from about 900 cps. to about 3500 cps.

12. The method of claim 7 wherein the weight ratio of guar gum to polyacrylamide is about 2:1 to about 20:1.

13. A thickened aqueous medium containing water and a mixture of guar gum and a polyacrylamide in an amount effective to thicken said medium, the weight ratio of said guar gum to said polyacrylamide ranging from about 0.5 to 1 to about 50 to 1, said guar gum having a one percent by weight aqueous viscosity of at least about 500 centipoises as measured with a Brookfield Viscometer, Model LVF, at 60 r.p.m. and 25° C., and said polyacrylamide having a degree of polymerization of about 12,000.

14. The composition of claim 13 wherein said polyacrylamide is an anionic polyacrylamide.

15. The composition of claim 13 wherein said polyacrylamide is a neutral polyacrylamide.

16. The composition of claim 13 wherein said polyacrylamide is a cationic polyacrylamide.

17. The composition of claim 13 wherein said guar gum has a one percent by weight aqueous viscosity ranging from about 900 cps. to about 3500 cps.

18. The composition of claim 13 wherein the weight ratio of guar gum to polyacrylamide is about 2:1 to about 20:1.

19. The composition of claim 13 wherein the concentration of said mixture of guar gum and polyacrylamide is about 0.1% to about 3% by weight of the water in said aqueous medium.

20. The composition of claim 18 wherein the concentration of said mixture of guar gum and polyacrylamide is about 0.1% to about 3% by weight of the water in said aqueous medium.

21. The composition of claim 13 having a pH ranging from about 5 to about 11.

22. The composition of claim 14 having a pH ranging from about 5 to about 11.

23. The composition of claim 14 having a pH of about 6 to about 9.

24. The composition of claim 14 having a pH of about 7.

References Cited
UNITED STATES PATENTS

| | | | |
|---|---|---|---|
| 2,758,102 | 8/1956 | Grummitt et al. | 260—29.6 |
| 3,346,555 | 10/1967 | Nordgren | 260—209 |
| 3,511,791 | 5/1970 | Puetzer et al. | 260—17.4 |

WILLIAM H. SHORT, Primary Examiner

L. L. LEE, Assistant Examiner

U.S. Cl. X.R.

260—29.6 HN, 29.6 PT